United States Patent
Thadikaran et al.

(10) Patent No.: US 9,165,141 B2
(45) Date of Patent: Oct. 20, 2015

(54) SYSTEMS AND METHODS FOR PROVIDING ANTI-MALWARE PROTECTION AND MALWARE FORENSICS ON STORAGE DEVICES

(75) Inventors: Paul J. Thadikaran, Rancho Cordova, CA (US); Adam Greer Wright, Corrales, NM (US); Paritosh Saxena, Portland, OR (US); Nicholas D. Triantafillou, Portland, CA (US); Thomas R. Bowen, Albuquerque, NM (US)

(73) Assignee: Intel Corporation, Santa Clara, CA (US)

( * ) Notice: Subject to any disclaimer, the term of this patent is extended or adjusted under 35 U.S.C. 154(b) by 183 days.

(21) Appl. No.: 13/976,382

(22) PCT Filed: Dec. 22, 2011

(86) PCT No.: PCT/US2011/067020
§ 371 (c)(1),
(2), (4) Date: Jun. 26, 2013

(87) PCT Pub. No.: WO2013/095568
PCT Pub. Date: Jun. 27, 2013

(65) Prior Publication Data
US 2013/0291110 A1    Oct. 31, 2013

(51) Int. Cl.
*G06F 21/55* (2013.01)
*G06F 21/78* (2013.01)

(52) U.S. Cl.
CPC .............. *G06F 21/554* (2013.01); *G06F 21/78* (2013.01)

(58) Field of Classification Search
CPC combination set(s) only.
See application file for complete search history.

(56) References Cited

U.S. PATENT DOCUMENTS

| | | | |
|---|---|---|---|
| 6,357,008 B1 * | 3/2002 | Nachenberg | 726/24 |
| 8,881,282 B1 * | 11/2014 | Aziz et al. | 726/24 |
| 2006/0184717 A1 * | 8/2006 | Rothman et al. | 711/103 |
| 2008/0046997 A1 * | 2/2008 | Wang | 726/16 |
| 2009/0089879 A1 * | 4/2009 | Wang et al. | 726/24 |

* cited by examiner

*Primary Examiner* — Beemnet Dada
(74) *Attorney, Agent, or Firm* — Nicholson De Vos Webster & Elliott LLP

(57) ABSTRACT

Systems and methods for providing features that enable anti-malware protection on storage devices are described. In one embodiment, a storage device includes a controller, firmware, and memory. The controller manages input/output operations for the storage device. The firmware provides features for protection against malware. The memory includes secure storage that is configured to provide a set of storage operations.

13 Claims, 7 Drawing Sheets

SYSTEMS AND METHODS FOR PROVIDING ANTI-MALWARE PROTECTION AND MALWARE FORENSICS ON STORAGE DEVICES

CROSS-REFERENCE TO RELATED APPLICATION

This patent application is a U.S. National Phase Application under 35 U.S.C. §371 of International Application No. PCT/US2011/067020, filed Dec. 22, 2011, entitled SYSTEMS AND METHODS FOR PROVIDING ANTI-MALWARE PROTECTION AND MALWARE FORENSICS ON STORAGE DEVICES.

TECHNICAL FIELD

The present disclosure relates to systems and methods for providing anti-malware protection and malware forensics on storage devices.

BACKGROUND

Security is an important problem for any compute platform having data that resides in a storage device. Malware threats are growing at exponential rate. Malware (e.g., low level malware like rootkits) is getting stealthier and is attacking the host (personal computer) system stack far below the protection provided by anti-virus/anti-malware (AV/AM) approaches. Once low level malware has infected the system, a state of the system as seen by AV/AM is in control of the malware.

The AV/AM approaches provided by independent software vendor (ISV) applications desire access to virus and malware information in the storage device to assess the nature and level of security threats posed by virus and malware at any given instant, as well as to assess the impact (e.g., return on investment (ROI)) particular AV/AM actions taken in a network may have. This includes securely logging which viruses were detected, which viruses were cleaned, when the viruses were cleaned, etc.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Systems and methods for providing anti-malware protection and malware forensics on storage devices are described. Embodiments of the invention provide to an anti-virus ISV an improved understanding regarding how malware communicates to the storage device and what are the mechanisms the malware adopts to hide itself. Malware typically hides in a region that is not seen by an operating system. Having this trusted information across the entire network can help develop analytics to improve AV/AM protection and quantify the ROI. This capability will then enable fingerprinting and performing forensics on a particular malware threat.

In the following description, numerous specific details such as logic implementations, sizes and names of signals and buses, types and interrelationships of system components, and logic partitioning/integration choices are set forth in order to provide a more thorough understanding. It will be appreciated, however, by one skilled in the art that embodiments of the invention may be practiced without such specific details. In other instances, control structures and gate level circuits have not been shown in detail to avoid obscuring embodiments of the invention. Those of ordinary skill in the art, with the included descriptions, will be able to implement appropriate logic circuits without undue experimentation.

In the following description, certain terminology is used to describe features of embodiments of the invention. For example, the term "logic" is representative of hardware and/or software configured to perform one or more functions. For instance, examples of "hardware" include, but are not limited or restricted to, an integrated circuit, a finite state machine or even combinatorial logic. The integrated circuit may take the form of a processor such as a microprocessor, application specific integrated circuit, a digital signal processor, a microcontroller, or the like. The interconnect between chips each could be point-to-point or each could be in a multi-drop arrangement, or some could be point-to-point while others are a multi-drop arrangement.

Figure 1:
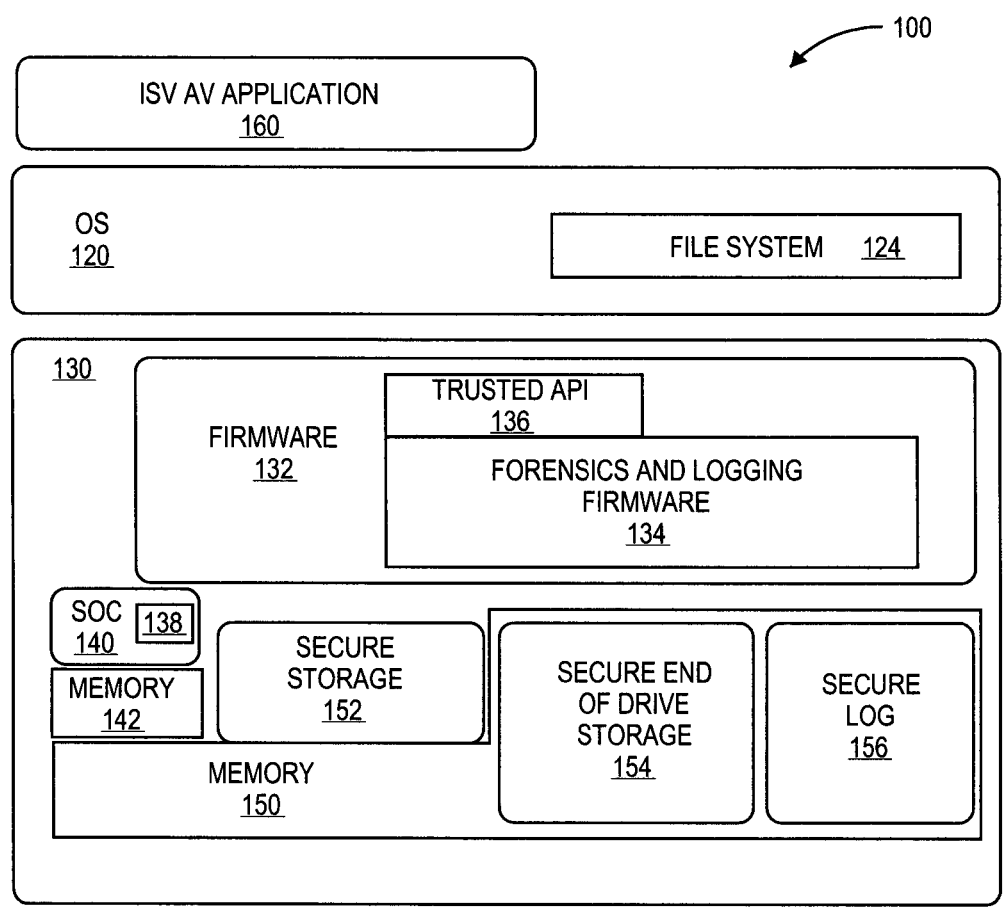
FIG. 1 illustrates a system having a security features in accordance with one embodiment of the invention.

FIG. 1 illustrates a system having security features in accordance with one embodiment of the invention. The system 100 includes an ISV AV application 160, an operating system (OS) 120 having a file system 124, and a storage device 130. The storage device 130 includes firmware 132, trusted application programming interface (API) 136, and forensics and logging firmware 134. The storage device 130 may also include a system on chip (SoC) 140 having a controller 138, memory 142 (e.g., DRAM, DDR), and memory 150 (e.g., non-volatile memory, NAND, etc.). The controller depending on a type of storage device may also be located in a different region of the storage device. In one embodiment, the controller 138 runs the firmware that gets loaded into memory 142. The firmware 132 and 134 and API 136 are a depiction of the software/module(s) that is running in the DRAM of memory 142. The non-volatile memory 150 (e.g., NAND storage) is accessible indirectly through the SoC 140 and its associated firmware 132, which includes the firmware forensics and logging module 134 that incorporates a Trusted API 136. The memory 150 may include secure storage 152, secure end of drive storage 154, and secure log 156. The secure storage 152, secure end of drive storage 154, and secure log 156 each represent a special region in NAND. These special regions are made possible by the behavior of the firmware forensics and logging module 134. The secure storage 152 may store a configurable set of activity, which can only be retrieved with proper authentication. For example, a register addressable range may be protected with the firmware. An actual real read/write request may not be given access to the protected range while a special SATA command may be given access from an authenticated entity. The secure end of drive storage 154 may be used to store read or write requests that are accessing illegal sectors (e.g., logical block addressing ranges) such as those beyond drive capacity. An actual real read/write request may not be given access to the secure end of drive storage while a special SATA command may be given access from an authenticated entity. This storage is secure because only an authenticated entity (e.g., ISV entity) can access this area. The secure log 156 is a storage area that logs commands such as "phishing" commands to get drive parameters or log command sequences requested by the AV application 160.

Embodiments of this invention involve implementing into the firmware of the storage device security components such as an interface command sequence log 156, a configurable secure storage 152, and secure end of drive storage 154. The log 156 enables storing the unique sequence of commands that are given to the storage device with several configurable parameters. These parameters include but are not limited to specific commands such as rarely used negative LBA commands, illegal command opcodes, illegal command argument usage, etc. Logging is active only for specific period of time. A logging start is conditional on specified events such as illegal command parameters. Once a log is completed, it is stored in a secure area in the memory 150 (e.g., NAND storage) that is accessible only to authenticated ISV's. The log is independent of the OS and provides a data trail for any type of malicious activity. A specific ISV is authenticated to talk with the storage device and this makes it difficult for malware to modify the log. In contrast, a conventional approach includes the OS having a log and the malware can hide or delete information stored in this log.

Figure 2A:
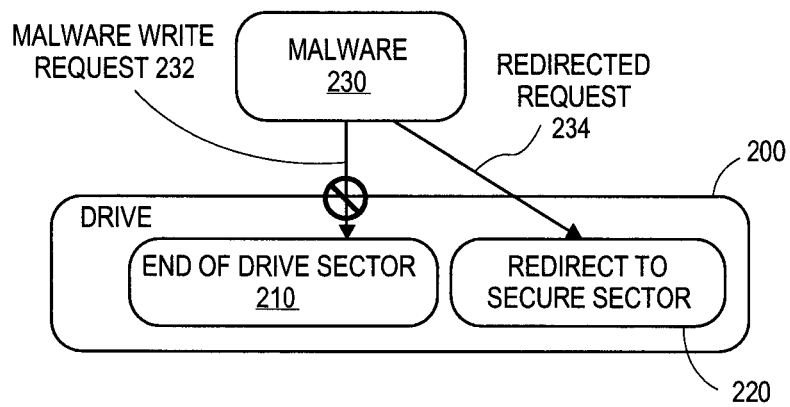
FIGS. 2A and 2B illustrate block diagrams that show how malware requests are redirected in accordance with one embodiment of the invention.
Figure 2B:
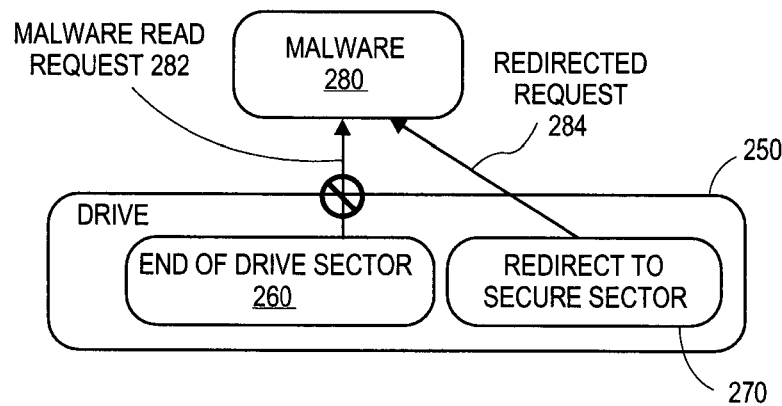

FIGS. 2A and 2B illustrate block diagrams that show how malware requests are redirected in accordance with one embodiment of the invention. The concept of configurable secure storage or secure end of drive storage encompasses firmware features that allow an authorized user to either monitor activity or restrict activity on areas of the storage device that may be of special interest. For instance, malware may often target free space that is assumed not to be in use by the OS as a location for its data payloads. Typically, the area near the end of the drive might be used in this way. Configurable secure storage allows an authenticated user to configure an area of interest, such as an unused space at the end of the storage device, for additional monitoring or for activity restriction at the firmware level. This functions by "redirecting" access to end of drive or other areas of interest. Due to the redirection, as illustrated in FIG. 2A, say a write request 232 from malware 230 to the end of drive sector 210 of drive 200 is now redirected with redirected request 234 to a secure sector 220 of the drive where the write payload is "recorded." This secure sector may be outside the maximum reported range of sectors and is accessible only to trusted partners such as AVS ISV's. A similar redirection can occur for read accesses too as illustrated in FIG. 2B. A read request 282 from malware 280 to the end of drive sector 260 of drive 250 is now redirected with redirected request 284 to a secure sector 270 of the drive where the write payload is "recorded." The ISV may want to record and protect data that malware delivers in write attempts to some region of the drive, but redirecting read attempts by malware may not be strictly required. This secure sector is, for example, outside the maximum reported range of sectors and is accessible only to trusted partners such as AVS ISV's. In an embodiment, an encrypted trusted channel is formed between an ISV entity and the storage device. The read/write requests and also special SATA commands may be redirected to access different regions (e.g., logical block addresses) of memory that malware may be trying to hide.

As discussed above, the secure sector may be outside the maximum reported range of sectors. Alternatively, there may be other ways of achieving the same protection via storage device firmware. For example, the ISV user might request that the firmware restrict access to a range of sectors inside the bounds of the operating system partition.

The concept of a "Secure Blackbox" or secure storage incorporates storage device firmware features that allow a set of storage operations, such as a sequence of write commands to be performed on a specially designated section of the storage device, but do not allow this designated area to be overwritten. In addition, these firmware features do not allow data to be directly read from the same specially designated area. In effect, these features create a "blackbox" functionality that prohibits unauthorized persons from tampering with stored data or even reading the same captured data. It is even conceivable that one set of firmware features would be loaded to record the data, while another set of features would need to be loaded to retrieve the data. Thus, physical access to the storage device, and a second version of firmware would be required to retrieve the data captured by the "Secure Blackbox" firmware. For example, a host computer may store certain critical information in the "Secure Blackbox." A vehicle's computer may store critical information (e.g., quick stops, different vehicle speeds) in the "Secure Blackbox."

It is the combination of above features that provide an AVS ISV or malware researcher with the tools to perform malware forensics on an infected system and thereby better understand the behavior of malware for enabling development of anti-malware protection. The AVS ISV or malware researcher can configure an area of a storage device that has suspicious activity (e.g., read/write requests beyond a range, out of bounds parameters, bogus commands that attack a drive). The firmware of the storage device is able to better protect itself from malware.

In one embodiment, a system 100 includes an operating system 120 for performing operations on the system and a storage device 130 to store data and communicate with the operating system. The storage device includes firmware to provide features for protection against malware. The storage device also includes memory 150 having configurable secure storage 154 that is configured to monitor activity or restrict activity in the secure storage. The memory also includes a secure log 156 to record activity of the system. The secure log enables storing a unique sequence of commands that are given to the storage device along with configurable parameters. The secure log is accessed by an authenticated external entity (e.g., ISV) to determine if the activity recorded in the log is suspicious. The authenticated external entity using the firmware configures a region of the secure storage to monitor activity or restrict activity in the secure storage based on determination of suspicious activity or known malware patterns. The authenticated external entity using the firmware configures unused space at an end region near an end of the memory to redirect access to the secure storage. A read request or a write request that is intended for the unused space near the end region is redirected to the secure storage.

In an embodiment, a storage device 130 includes a controller (e.g., microcontroller, processing unit) 138 to manage input/output operations for the storage device. The controller 138 runs the firmware that gets loaded into memory. The firmware provides features as discussed herein that provide an AVS ISV or malware researcher the tools to perform forensics on an infected system for protection against malware. Thus, the features enable a better understanding of behavior of malware for development of anti-malware solutions. The memory includes secure storage that is configured to provide a set of storage operations. The firmware allows the secure storage to be written by an authenticated entity or user. The firmware may include a first set of features that allow the secure storage to be written by the authenticated entity or user. The firmware may not allow the secure storage to be overwritten after it has been written. The firmware may only allow the secure storage to be read from by the authenticated entity or user. The firmware may include a second set of features that allow the secure storage to be read by the authenticated entity or user. The authenticated external entity using the firmware configures a region of the secure storage to monitor activity or restrict activity in the secure storage based on determination of suspicious activity.

Figure 3:
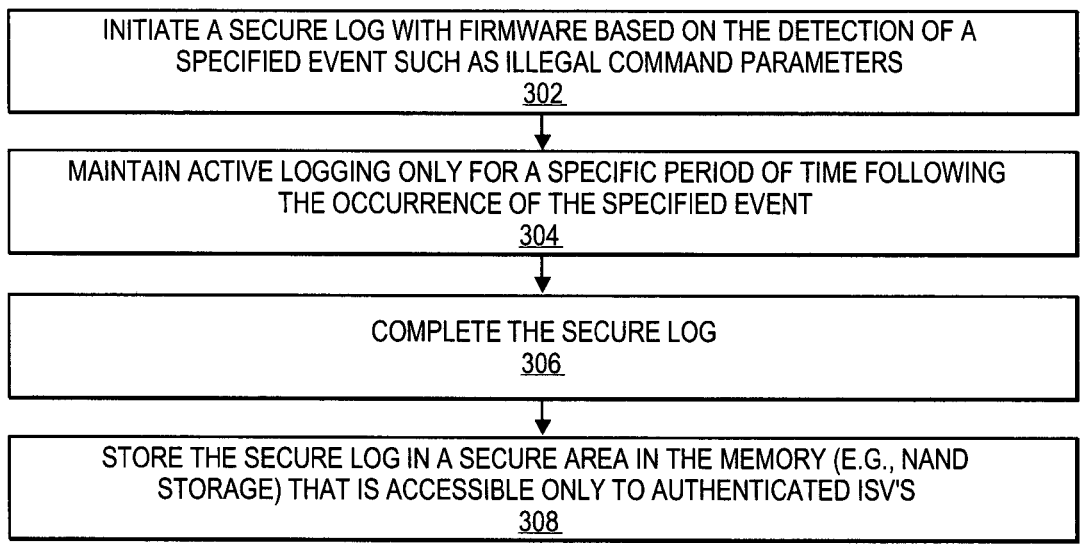
FIG. 3 illustrates a flow diagram of one embodiment for a computer-implemented method of implementing a secure log of a storage device with firmware in accordance with one embodiment of the invention.

FIG. 3 illustrates a flow diagram of one embodiment for a computer-implemented method 300 of implementing a secure log of a storage device with firmware in accordance with one embodiment of the invention. The method 300 is performed by processing logic that may include hardware (circuitry, dedicated logic, etc.), software (such as is run on a general purpose computer system or a dedicated machine or a device), or a combination of both. In one embodiment, the method 300 is performed by processing logic (e.g., firmware) associated with the devices or systems discussed herein.

A secure log (e.g., 156) enables storing the unique sequence of commands that are given to the storage device with several configurable parameters. These parameters include but are not limited to specific commands such as rarely used negative LBA commands, illegal command opcodes, illegal command argument usage, etc. At block 302, a secure log is initiated with firmware based on the detection of specified events such as illegal command parameters (e.g., illegal command opcodes, illegal command argument usage, etc.) At block 304, logging is actively maintained only for a specific period of time following the occurrence of the specified event. At block 306, the secure log is complete. At block 308, the secure log is stored in a secure area in the memory 150 (e.g., NAND storage) that is accessible only to authenticated ISV's. The log is independent of the OS and provides a data trail for any type of malicious activity. A specific ISV is authenticated to talk with the storage device and this makes it difficult for malware to modify the log.

FIGS. 4-7 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 4:
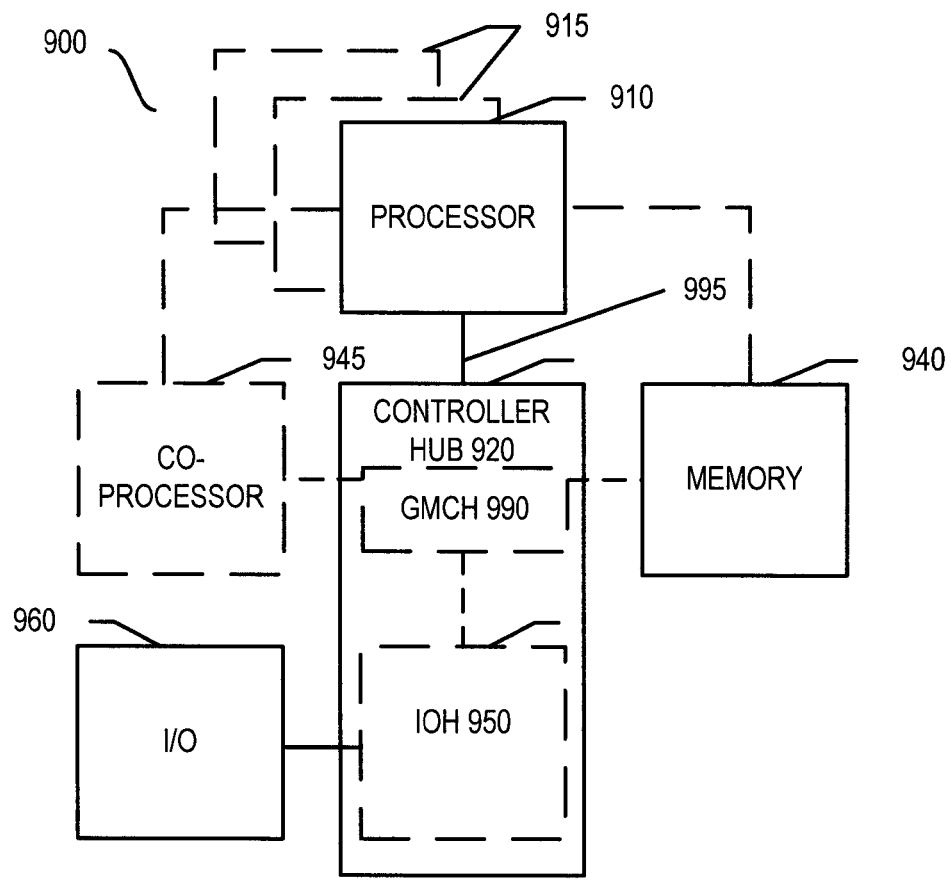
FIG. 4 is a block diagram of a system in accordance with one embodiment of the invention.

Referring now to FIG. 4, shown is a block diagram of a system 900 in accordance with one embodiment of the present invention. The system 900 may include one or more processors 910, 915, which are coupled to a controller hub 920. In one embodiment the controller hub 920 includes a graphics memory controller hub (GMCH) 990 and an Input/Output Hub (IOH) 950 (which may be on separate chips); the GMCH 990 includes memory and graphics controllers to which are coupled memory 940 and a coprocessor 945; the IOH 950 is couples input/output (I/O) devices 960 to the GMCH 990. Alternatively, one or both of the memory and graphics controllers are integrated within the processor (as described herein), the memory 940 and the coprocessor 945 are coupled directly to the processor 910, and the controller hub 920 in a single chip with the IOH 950. The GMCH 990 may also be coupled to a storage device (e.g., storage device 130, non-volatile memory) as discussed herein.

The optional nature of additional processors 915 is denoted in FIG. 4 with broken lines. Each processor 910, 915 may include one or more of the processing cores described herein.

The memory 940 may be, for example, dynamic random access memory (DRAM), phase change memory (PCM), or a combination of the two. For at least one embodiment, the controller hub 920 communicates with the processor(s) 910, 915 via a multi-drop bus, such as a frontside bus (FSB), point-to-point interface such as QuickPath Interconnect (QPI), or similar connection 995.

In one embodiment, the coprocessor 945 is a special-purpose processor, such as, for example, a high-throughput MIC processor, a network or communication processor, compression engine, graphics processor, GPGPU, embedded processor, or the like. In one embodiment, controller hub 920 may include an integrated graphics accelerator.

There can be a variety of differences between the physical resources 910, 915 in terms of a spectrum of metrics of merit including architectural, microarchitectural, thermal, power consumption characteristics, and the like.

In one embodiment, the processor 910 executes instructions that control data processing operations of a general type. Embedded within the instructions may be coprocessor instructions. The processor 910 recognizes these coprocessor instructions as being of a type that should be executed by the attached coprocessor 945. Accordingly, the processor 910 issues these coprocessor instructions (or control signals representing coprocessor instructions) on a coprocessor bus or other interconnect, to coprocessor 945. Coprocessor(s) 945 accept and execute the received coprocessor instructions.

Figure 5:
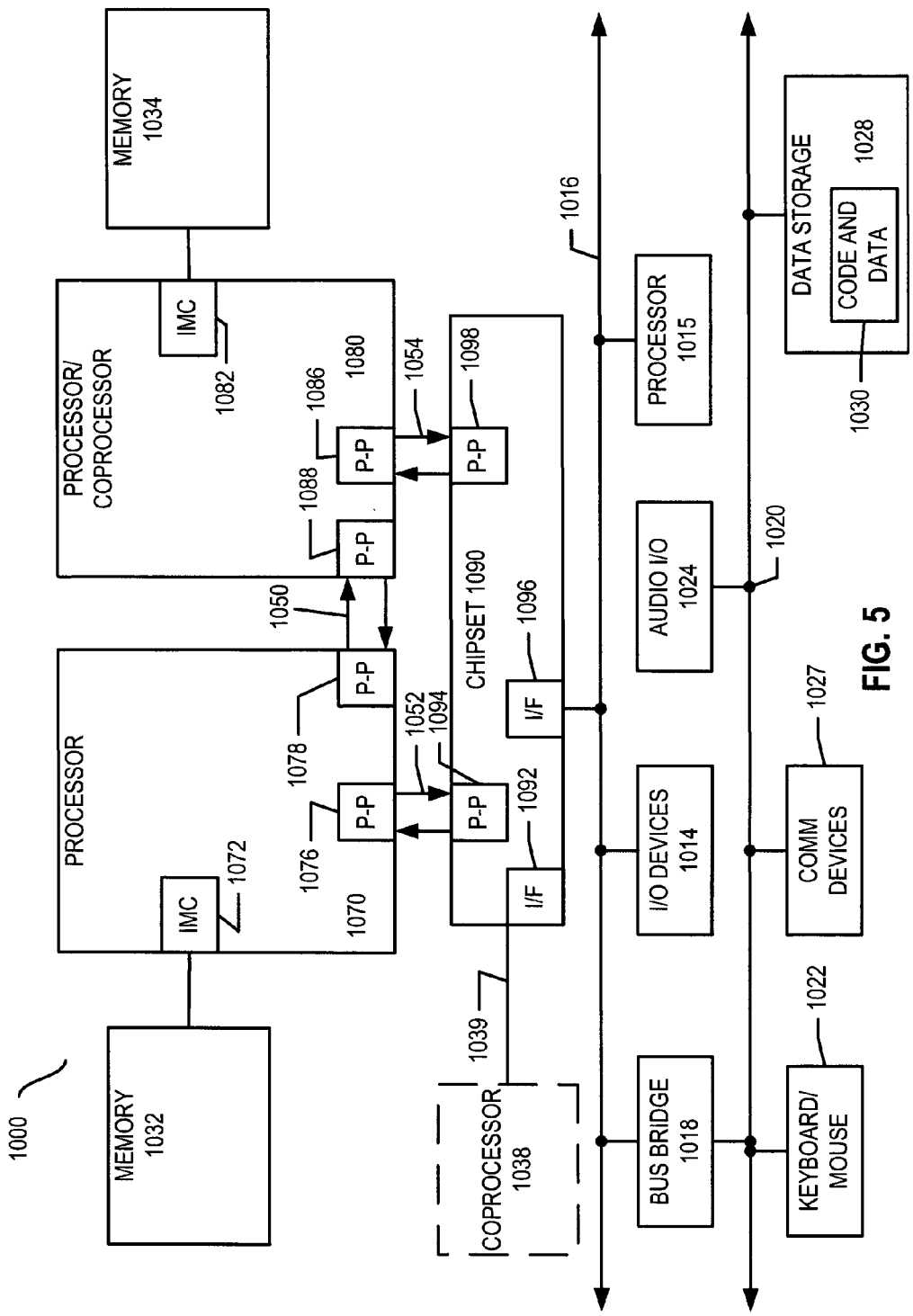
FIG. 5 is a block diagram of a second system in accordance with an embodiment of the invention.

Referring now to FIG. 5, shown is a block diagram of a first more specific exemplary system 1000 in accordance with an embodiment of the present invention. As shown in FIG. 5, multiprocessor system 1000 is a point-to-point interconnect system, and includes a first processor 1070 and a second processor 1080 coupled via a point-to-point interconnect 1050. In one embodiment of the invention, processors 1070 and 1080 are respectively processors 910 and 915, while coprocessor 1038 is coprocessor 945. In another embodiment, processors 1070 and 1080 are respectively processor 910 and coprocessor 945.

Processors 1070 and 1080 are shown including integrated memory controller (IMC) units 1072 and 1082, respectively. Processor 1070 also includes as part of its bus controller units point-to-point (P-P) interfaces 1076 and 1078; similarly, second processor 1080 includes P-P interfaces 1086 and 1088. Processors 1070, 1080 may exchange information via a point-to-point (P-P) interface 1050 using P-P interface circuits 1078, 1088. As shown in FIG. 5, IMCs 1072 and 1082 couple the processors to respective memories, namely a memory 1032 and a memory 1034, which may be portions of main memory locally attached to the respective processors.

Processors 1070, 1080 may each exchange information with a chipset 1090 via individual P-P interfaces 1052, 1054 using point to point interface circuits 1076, 1094, 1086, 1098. Chipset 1090 may optionally exchange information with the coprocessor 1038 via a high-performance interface 1039. In one embodiment, the coprocessor 1038 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1090 may be coupled to a first bus 1016 via an interface 1096. In one embodiment, first bus 1016 may be a Peripheral Component Interconnect (PCI) bus, or a bus such as a PCI Express bus or another third generation I/O interconnect bus, although the scope of the present invention is not so limited.

As shown in FIG. 5, various I/O devices 1014 may be coupled to first bus 1016, along with a bus bridge 1018 which couples first bus 1016 to a second bus 1020. In one embodiment, one or more additional processor(s) 1015, such as coprocessors, high-throughput MIC processors, GPGPU's, accelerators (such as, e.g., graphics accelerators or digital signal processing (DSP) units), field programmable gate arrays, or any other processor, are coupled to first bus 1016. In one embodiment, second bus 1020 may be a low pin count (LPC) bus. Various devices may be coupled to a second bus 1020 including, for example, a keyboard and/or mouse 1022, communication devices 1027 and data storage 1028 (e.g., storage device as described herein, storage device 130 of FIG. 1) such as a disk drive or other mass storage device which may include instructions/code and data 1030, in one embodiment. Further, an audio I/O 1024 may be coupled to the second bus 1020. Note that other architectures are possible. For example, instead of the point-to-point architecture of FIG. 5, a system may implement a multi-drop bus or other such architecture.

Figure 6:
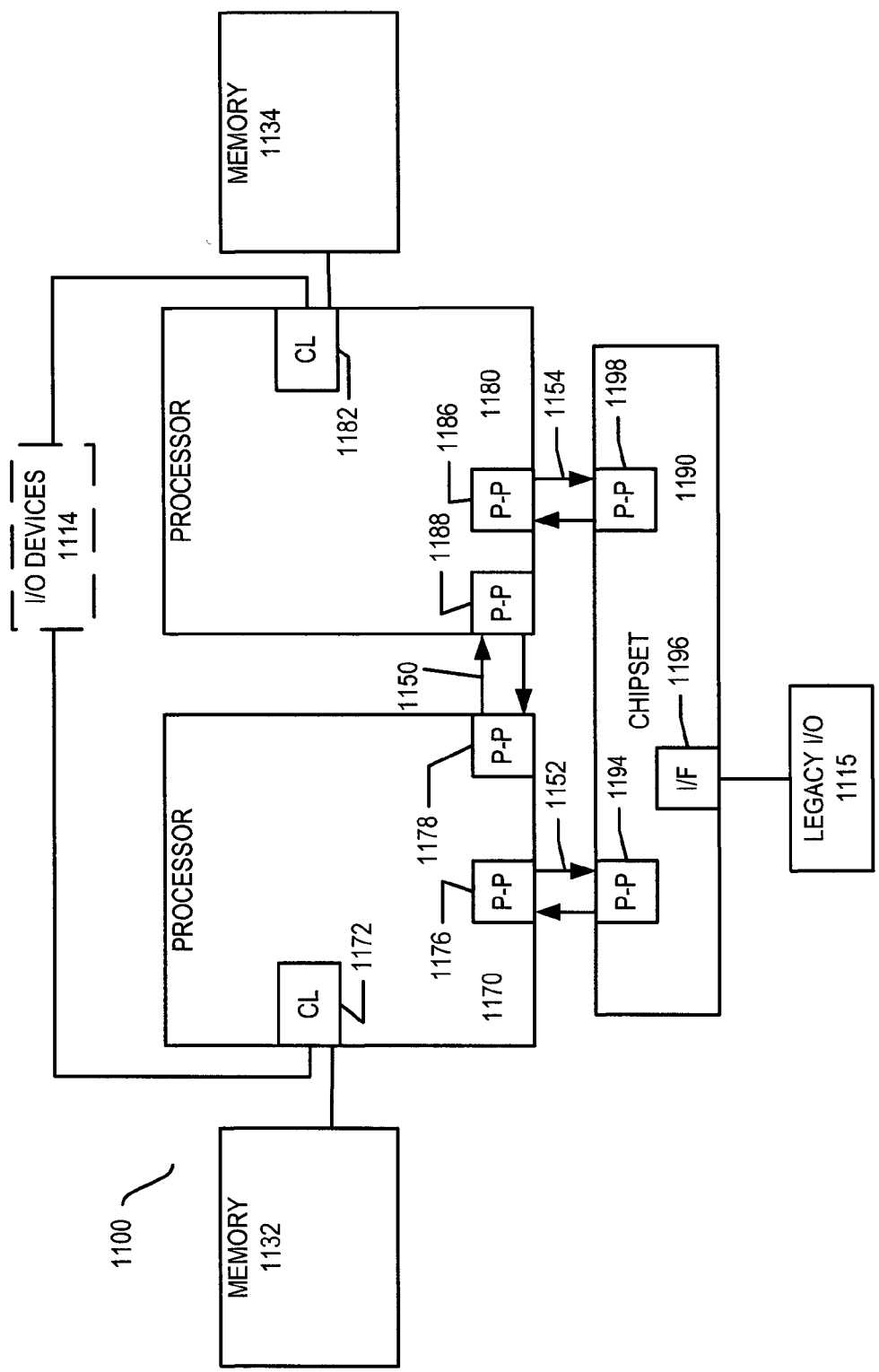
FIG. 6 is a block diagram of a third system in accordance with an embodiment of the invention.

Referring now to FIG. 6, shown is a block diagram of a second more specific exemplary system 1100 in accordance with an embodiment of the present invention. Like elements in FIGS. 5 and 6 bear like reference numerals, and certain aspects of FIG. 5 have been omitted from FIG. 6 in order to avoid obscuring other aspects of FIG. 6. FIG. 6 illustrates that the processors 1170, 1180 may include integrated memory and I/O control logic ("CL") 1172 and 1182, respectively. Thus, the CL 1172, 1182 include integrated memory controller units and include I/O control logic. FIG. 6 illustrates that not only are the memories 1132, 1134 coupled to the CL 1172, 1182, but also that I/O devices 1114 are also coupled to the control logic 1172, 1182. Legacy I/O devices 1115 are coupled to the chipset 1190. The memories 1132, 1134 may include non-volatile memory such as the storage device discussed herein (e.g., storage device 130 of FIG. 1).

Figure 7:
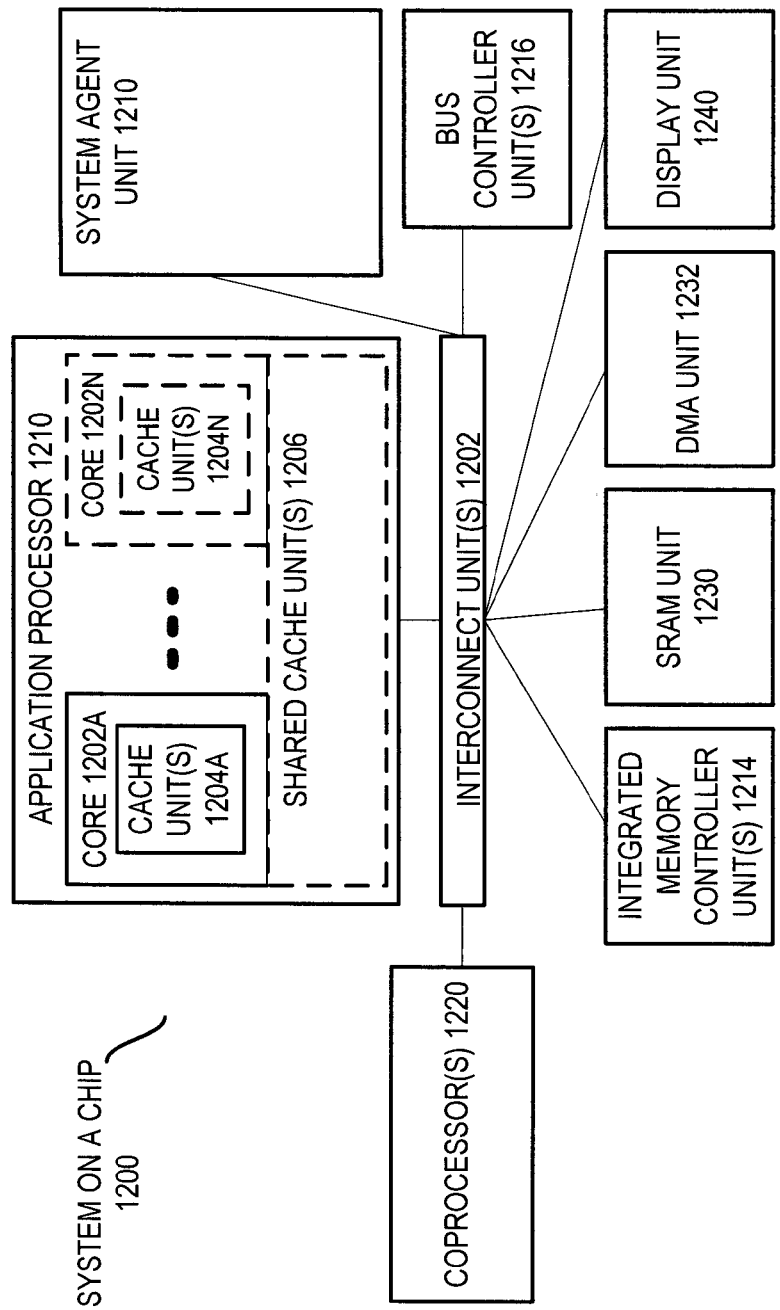
FIG. 7 illustrates a functional block diagram illustrating a system implemented in accordance with one embodiment of the invention.

Referring now to FIG. 7, shown is a block diagram of a SoC 1200 in accordance with an embodiment of the present invention. Also, dashed lined boxes are optional features on more advanced SoCs. In FIG. 7, an interconnect unit(s) 1202 is coupled to: an application processor 1210 which includes a set of one or more cores 1202A-N and shared cache unit(s) 1206; a system agent unit 1210; a bus controller unit(s) 1216; an integrated memory controller unit(s) 1214; a set or one or more coprocessors 1220 which may include integrated graphics logic, an image processor, an audio processor, and a video processor; an static random access memory (SRAM) unit 1230; a direct memory access (DMA) unit 1232; and a display unit 1240 for coupling to one or more external displays. In one embodiment, the coprocessor(s) 1220 include a special-purpose processor, such as, for example, a network or communication processor, compression engine, GPGPU, a high-throughput MIC processor, embedded processor, or the like. The SoC 1200 may include or be coupled to a storage device as described herein.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1030 illustrated in FIG. 5, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

It should be appreciated that reference throughout this specification to "one embodiment" or "an embodiment" means that a particular feature, structure or characteristic described in connection with the embodiment is included in at least one embodiment. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments.

In the above detailed description of various embodiments, reference is made to the accompanying drawings, which form a part hereof, and in which are shown by way of illustration, and not of limitation, specific embodiments in which the invention may be practiced. In the drawings, like numerals describe substantially similar components throughout the several views. The embodiments illustrated are described in sufficient detail to enable those skilled in to the art to practice the teachings disclosed herein. Other embodiments may be utilized and derived there from, such that structural and logical substitutions and changes may be made without departing from the scope of this disclosure. The following detailed description, therefore, is not to be taken in a limiting sense, and the scope of various embodiments is defined only by the appended claims, along with the full range of equivalents to which such claims are entitled.

What is claimed is:

1. A system, comprising:
    an operating system to perform operations on the system;
    a storage device to communicate with the operating system, the storage device comprising, memory including configurable secure storage;
    firmware to provide features for protection against malware by allowing configuration of unused space at an end region near an end of the memory to redirect access to a configurable secure storage and monitoring activity or restriction of activity in the secure storage based upon an determination of suspicious activity; and
    a controller to execute the firmware;
    a secure log to record activity of the system, wherein the secure log is accessible by an authenticated external entity to determine when the activity recorded in the log is suspicious.

2. The system of claim 1, wherein the secure log enables storing a unique sequence of commands that are given to the storage device along with configurable parameters.

3. The system of claim 1, wherein a read request or a write request that is intended for the unused space near the end region is redirected to the secure storage.

4. A storage device comprising:
    a controller to manage input/output operations for the storage device;
    firmware being implemented with the controller, the firmware to provide features for protection against malware by allowing configuration of unused space at an end region near an end of memory to redirect access to a configurable secure storage and monitoring activity or restriction of activity in the secure storage based upon an determination of suspicious activity; and
    memory communicatively coupled to the controller, the memory having secure storage that is configured to provide a set of storage operations, wherein the firmware allows the secure storage to be written by an authenticated entity and the firmware comprises a first set of features that allow the secure storage to be written by the authenticated entity.

5. The storage device of claim 4, wherein the firmware does not allow the secure storage to be overwritten.

6. The storage device of claim 5, wherein the firmware only allows the secure storage to be read from by the authenticated entity or user.

7. The storage device of claim 6, wherein the firmware comprises a second set of features that allow the secure storage to be read only by the authenticated entity or user.

8. A computer-implemented method, comprising:
    configuring unused space at an end region near an end of the memory to redirect access to a secure storage;
    monitoring activity or restriction of activity in the secure storage based upon an determination of a specified event;
    initiating a secure log with firmware of a storage device of a system based on the detection of the specified event;
    maintaining active logging for a specific period of time following the occurrence of the specified event;
    completing the secure log; and
    storing the secure log in a secure area in the storage device.

9. The computer-implemented method of claim 8, wherein the secure log is accessible only to an authenticated entity or user.

10. The computer-implemented method of claim 9, wherein the secure log is independent of an operating system of the system.

11. The computer-implemented method of claim 8, wherein the specified event comprises one or more illegal command parameters.

12. The computer-implemented method of claim 8, wherein the secure log provides a data trail for any type of malicious activity.

13. The computer-implemented method of claim 8, wherein malware is not able to modify or delete the secure log.

* * * * *